United States Patent
Weber et al.

(10) Patent No.: US 11,550,137 B2
(45) Date of Patent: Jan. 10, 2023

(54) PROGRAMMABLE MICROSCOPE CONTROL UNIT HAVING FREELY USABLE CONNECTIONS, MICROSCOPE SYSTEM HAVING A MICROSCOPE CONTROL UNIT, AND METHOD FOR OPERATING A MICROSCOPE CONTROL UNIT

(71) Applicant: Leica Microsystems CMS GmbH, Wetzlar (DE)

(72) Inventors: Markus Weber, Wetzlar (DE); Robert Mainberger, Braunfels (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 427 days.

(21) Appl. No.: 16/608,877

(22) PCT Filed: Apr. 26, 2018

(86) PCT No.: PCT/EP2018/060714
§ 371 (c)(1),
(2) Date: Oct. 28, 2019

(87) PCT Pub. No.: WO2018/197609
PCT Pub. Date: Nov. 1, 2018

(65) Prior Publication Data
US 2021/0116695 A1 Apr. 22, 2021

(30) Foreign Application Priority Data
Apr. 28, 2017 (DE) ...................... 10 2017 109 252.8

(51) Int. Cl.
*G02B 21/36* (2006.01)
*G05B 19/042* (2006.01)

(52) U.S. Cl.
CPC ....... *G02B 21/365* (2013.01); *G05B 19/0426* (2013.01); *G05B 2219/2656* (2013.01)

(58) Field of Classification Search
CPC .............. G02B 21/365; G05B 19/0426; G05B 2219/2656; G05B 2219/45121
See application file for complete search history.

(56) References Cited

U.S. PATENT DOCUMENTS

2005/0111712 A9 * 5/2005 Jung .................. G01N 15/1468
382/128
2012/0005621 A1 * 1/2012 Kollin ..................... G06F 30/34
715/781

(Continued)

FOREIGN PATENT DOCUMENTS

DE 102010063392 A1 5/2012
EP 1426754 A1 * 6/2004

(Continued)

OTHER PUBLICATIONS

Anonymous, "Products2—TriggerScope," Jan. 14, 2016, http://www.triggerscope.com/products, retrieved on Aug. 2, 2018, XP055496975.

(Continued)

*Primary Examiner* — Kidest Bahta
(74) *Attorney, Agent, or Firm* — Leydig, Voit & Mayer, Ltd.

(57) ABSTRACT

A microscope control unit includes at least one connection which is connectable to one or more electrically addressable microscope components or other electrically controllable components. At least one connection parameter of the at least one connection is programmatically configurable. At least one script with script commands is provided on the microscope control unit. At least one terminal is addressable by the script commands.

20 Claims, 4 Drawing Sheets

(56) References Cited

U.S. PATENT DOCUMENTS

| | | |
|---|---|---|
| 2012/0120224 A1 | 5/2012 | Zuest et al. |
| 2012/0229048 A1 | 9/2012 | Archer |
| 2014/0118528 A1* | 5/2014 | Wolff ............... G02B 21/365 348/79 |
| 2017/0103253 A1 | 4/2017 | Pyun et al. |
| 2017/0139196 A1 | 5/2017 | Roul et al. |

FOREIGN PATENT DOCUMENTS

| | | |
|---|---|---|
| EP | 1426754 A1 | 6/2004 |
| JP | 2002-290490 A | 10/2002 |
| JP | 2003-172877 A | 6/2003 |
| JP | 2007-150697 A | 6/2007 |
| JP | 4620035 B2 * | 1/2011 |
| WO | WO 2015144650 A1 | 10/2015 |

OTHER PUBLICATIONS

Anonymous, "Arduino—Digital Pins," Jun. 18, 2015, https://www.arduino.cc/en/Tutorial/DigitalPins, retrieved on Aug. 3, 2018, XP055497313.

Anonymous, "Hardware-triggering with Micro-Manager: a case study," Apr. 11, 2017, https://github.com/vanNimwegenLab/MiM_NikonTi/blob/master/Docs/NikonTi_hardware_triggering.md, retrieved on Aug. 2, 2018, XP055496929.

Anonymous, "Raspberry Pi Controlled Microscope," Aug. 28, 2013, http://www.openlabtools.org/presentations/2013_08_RPiWorkshop/OLT_MicroscopePresentation.pdf, retrieved on Aug. 3, 2018, XP055497338.

Roul, Julien et al. "Optimal Control for Multidimensional Microscopy," Focus on Microscopy, Bordeaux, Apr. 10, 2017, XP055496949.

Alexandrov, Paul et al. "Simultaneous in situ Detection of the Optical Fluorescence, Fluorescence Recovery Kinetics After Photobleaching & Membrane Ion Flux on the Electrophysiological Lab-on-a-Chip," American Journal of Optics and Photonics, vol. 3, No. 5, Nov. 22, 2015, p. 118, XP055497365.

Arch Reactor et al. "Internet of Things Microscope," Dec. 28, 2016, XP055772199, Hackaday.io, Online, pp. 1-11.

Badenlab, "RPi-microscope for histology with focus-drive and XY stage," Jul. 5, 2014, XP055771995, thingiverse.com, Online, pp. 1-4.

Nikon, "Ti-RCP Remote Control Pad Instructions," Dec. 10, 2007, XP055772057, Nikon, Japan, pp. 1-84.

Pi My Life Up, "Raspberry Pi Pinout Diagram," Chapter 4—Advanced Operations, Mar. 24, 2016, XP055772234, pimylifeup.com, Online, pp. 1-55.

Doran, Steven, "How to Perform Real-Time Processing on the Raspberry Pi," Mar. 2, 2015, XP055923798, pp. 1-28, Scale 13x, US.

* cited by examiner

PROGRAMMABLE MICROSCOPE CONTROL UNIT HAVING FREELY USABLE CONNECTIONS, MICROSCOPE SYSTEM HAVING A MICROSCOPE CONTROL UNIT, AND METHOD FOR OPERATING A MICROSCOPE CONTROL UNIT

CROSS-REFERENCE TO PRIOR APPLICATIONS

This application is a U.S. National Phase Application under 35 U.S.C. § 371 of International Application No. PCT/EP2018/060714, filed on Apr. 26, 2018, and claims benefit to German Patent Application No. DE 10 2017 109 252.8, filed on Apr. 28, 2017. The International Application was published in German on Nov. 1, 2018 as WO 2018/197609 under PCT Article 21(2).

FIELD

The present invention relates to a microscope control unit having at least one connection which can be connected to one or more electrically addressable microscope components or other electrically addressable components, and to an automated microscope system having such a microscope control unit and to a method for operating such a microscope control unit.

BACKGROUND

Microscopes having one or more electrically addressable components are usually referred to as automated microscopes, in which, for example, a digital camera functions as a detector and the images are displayed on a monitor or, for example, the light source can be activated. This can also be a digital microscope, which is characterized in that it dispenses with a tube for visual viewing of the microscope image and generates a digital microscope image and displays this on a display or monitor.

Such automated microscopes generally have a microscope control unit which comprises an electronic unit and a control program, the so-called firmware. A program part must be present in the firmware for each microscope component which is to be electrically addressable. This relates, for example, to components such as camera, x/y table, zoom, illumination, etc. If further addressable components are to be connected to the microscope, the firmware must in each case be modified and subsequently changed on existing microscopes. The microscope control unit can be connected to input devices, such as rotary knobs, switches or touch-screens, but also to a user interface on conventional PCs which runs by means of a so-called human machine interface (HMI software for human machine interface).

For example, DE 10 2010 063 392 A1 shows a digital microscope which dispenses with visual observation and is equipped with an image capturing device, optical and digital, designed to display the object image in a display region and to record inputs in the display region, the microscope being set up to change settings of motorized and/or electrically controllable microscope components on the microscope on the basis of the inputs recorded in the display region of the sensor screen.

Modern microscope systems, in particular, have a microscope control unit, electrically controllable microscope components connected thereto, and a computer (PC) for operation. In this case, the PC can also be used, within limits, to offer the user in a software, automated sequences and boundary conditions for selection, which are then executed by the microscope control unit. Accordingly, operations that are not offered cannot be performed.

EP 1 426 754 A1 relates to the control of an image recording in which a control unit drives the devices required for image recording and a computer unit processes the data of the recorded images. In order to increase the speed, the flexibility and the reproducibility of the image recording, it is proposed to combine control commands for image recording into at least one script and to transmit at least one script from the computer unit to the control unit.

SUMMARY

In an embodiment, the present invention provides a microscope control unit including at least one connection which is connectable to one or more electrically addressable microscope components or other electrically controllable components. At least one connection parameter of the at least one connection is programmatically configurable. At least one script with script commands is provided on the microscope control unit. At least one terminal is addressable by the script commands.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
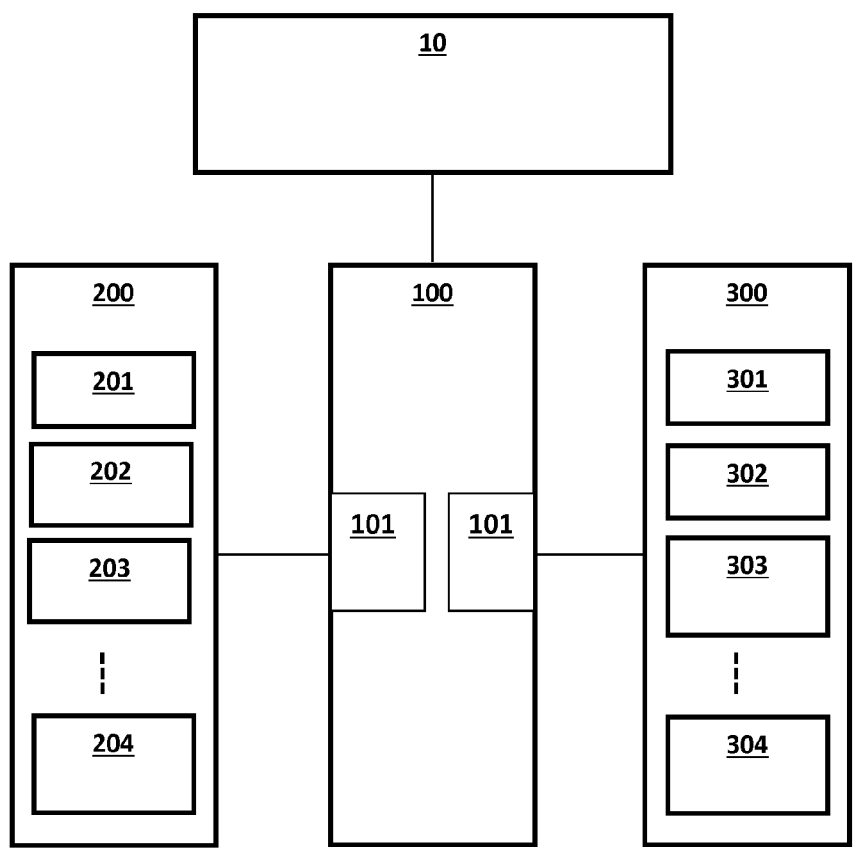
FIG. 1 schematically shows, in a block diagram, a microscope system in accordance with a preferred embodiment of the invention.

It is desirable to break down the limits described above in the predetermined automated procedures and make any electrically addressable components usable by means of the microscope control unit.

Embodiments of the invention provide a microscope control unit comprising at least one connection which can be connected to one or more electrically controllable microscope components or other electrically controllable components, a microscope system having such a microscope control unit, and a method for operating such a microscope control unit with the features of the independent claims.

In an embodiment, the invention provides a microscope control unit comprising at least one connection which can be connected to one or more electrically controllable microscope components or other electrically controllable components, wherein at least one connection parameter of the at least one connection is programmatically configurable, wherein at least one script with script commands is stored on the microscope control unit and wherein the at least one connection can be activated by means of said script commands. This microscope control unit according to an embodiment of the invention has the advantage that the at least one connection can be used freely by the user. The term "connection" denotes an electrical interface which can be defined as inputs or outputs for electrical control signals to electrically controllable components and/or to electrically controllable components which are arranged inside or in the vicinity of the microscope system.

"Free" means, in particular, that the connection in question does not serve a predetermined purpose but can be used selectively and in particular also freely definable in its function or in its protocol, so that the connection can be used in a targeted manner by means of appropriate script commands. In this way, in particular, any electrically addressable microscope components or other components operated in conjunction with the microscope can be controlled by the microscope control unit when the script is executed.

For example, the microscope control unit can be set up to actuate an arbitrary combination of one or more of the electrically controllable microscope components mentioned below by means of the script commands via at least one connection:

A motorized XY table,
A motorized Z drive for adjusting the distance between an objective and a sample,
A motorized rotary disk with optical components, for example an incident rotary disk (IL Turret) with several fluorescence filter cubes selectively insertable into the beam path of the microscope,
An electrically switchable light source,
A laser,
An acoustooptic beam splitter (AOBS),
An acoustooptic modulator (AOM),
A digital camera,
A detector, for example a hybrid detector or a photo multiplier.

Alternatively or additionally, the microscope control unit can be set up to actuate other electrically addressable components by means of the script commands. Electrically controllable components which can be operated in conjunction with the microscope and a test carried out with it are conceivable in this case. Thus, the experimental setup around the microscope may require, for example, a controllable climatic chamber or a water supply or discharge line or a gas supply or gas discharge (for example evacuation to a specific underpressure). In this case, for example, an electrically controllable water pump or gas pump or vacuum pump or an electrically controllable climate control unit could be controlled by the microscope control unit via the at least one connection.

Embodiments of the invention offer the advantage that the user of the microscope himself can select which electrically controllable components he wants to use and couple to the microscope. This free configuration of the microscope with microscope components quasi-newly adapted to the microscope and the control of these microscope components takes place independently of whether these were already known at the time of manufacture of the microscope or are supported routinely by the firmware of the manufacturer of the microscope control unit. A disadvantage of previous solutions is that each component to be controlled had to be permanently implemented in the microscope control unit. Thus, every smallest extension of the test setup by a newly used, electrically actuated component entails a change to the microscope control unit. For example, a new type of camera with new triggering behavior inevitably required a factory change to the microscope control unit by the manufacturer.

In contrast to conventional microscope systems, therefore, in the context of scripts running on the microscope control unit, not only predetermined microscope components, but also arbitrary, newly added microscope components or other components can be used in the program sequence if they can be controlled by means of the at least one connection of the microscope control unit.

The at least one connection parameter of the at least one connection can preferably be configured programmatically by means of the script commands. In this way, both the configuration of the connection and its subsequent activation can be realized by means of one and the same script. This is particularly user-friendly.

Alternatively or additionally, a configuration environment may be provided in the form of a user program, for example in the form of the programming device or PC mentioned below.

The at least one programmatically configurable connection parameter preferably comprises at least one parameter that configures the connection as:
Input or Output
analog or digital
Current or voltage interface.

The at least one programmatically configurable connection parameter preferably comprises at least one parameter selected from:
Communication protocol
Transmission rate
Signal amplitude.

The configuration may comprise any combinations of parameters.

It can thus, in particular, be provided that at least one connection comprises an input and can be configured selectively as an analog input or as a digital input.

As an alternative or in addition, special connections designed as analog inputs and special connections designed as digital inputs can also be included and be configurable. Such an embodiment is easier to manufacture.

The same also applies to the outputs. At least one connection preferably comprises an output and can optionally be configured as an analog output or as a digital output. Alternatively or additionally, special connections designed as analog outputs and special connections designed as digital outputs are also included and configurable.

In accordance with another embodiment, at least one connection comprises a so-called general purpose input/output connection (GPIO). It is then a connection whose behavior, whether as input or output, can be freely configured programmatically. Such an embodiment provides a high degree of flexibility.

In a beneficial embodiment, the microscope control unit is set up to be able to process script commands of a predetermined script command set. This facilitates later programming by a user. Preferably, the script instruction set also contains script commands to which no functions of the at least one port are assigned, but other functions, in particular, program flow operations (such as waiting, repeating, looping etc.) computing operations (such as adding, multiplying, . . . ) etc.

In a further beneficial embodiment of the microscope control unit, the script commands of the at least one script can be selected by a user from the script instruction set, and their sequence in the script can be specified by the user. In other words, the user can substantially freely program the script using the instruction set.

In a further embodiment, the microscope control unit is designed to be connected to a user interface for data-transmitting, via which the script commands of at least one script can be selected by the user from the script command set and via which their sequence in the script can be specified by the user.

For this purpose, the microscope control unit can be designed such that the user interface is embodied as a hardware-based input unit of a programming device.

In another embodiment of the microscope control unit, the user interface can be designed as a user interface of a user program running on a separate computing unit, in particular a PC. The user program can in particular be a (pure) programming environment or an operating program for the microscope system.

For this purpose, the microscope control unit is preferably designed to be connected to a PC in a data-transmitting manner. In particular, HMI software, which serves as a user interface, can be executed on the PC in that it is designed as a user interface of the user program. From there, the script is transmitted to the microscope control unit, by means of which the microscope system can be operated. In this way, the programming and/or operation of the microscope system becomes very convenient and simple. At the same time, the PC can also be used for visualizing, for example, recorded images or any measured values.

After the script has been compiled, it can also be stored in a volatile memory, for example, in a cache memory, or in a nonvolatile memory of the operating PC or the microscope control unit or in an external memory or a server.

Another variant of the microscope control unit can be configured in such a way that the script can be transferred as a text file to the microscope control unit. In this case, it is advantageous if the script is received in a text format, for example ASCII, ANSI or Unicode/UTF, since this ensures compatible compatibility.

The microscope control unit is preferably designed for a fast and user-friendly activation of at least one terminal in that it is assigned a control program with an interpreter for the script, which converts the script commands into functions of at least one terminal. This offers the possibility of conveniently transmitting the script in an understandable or readable form to the microscope control unit, i.e. as a sequence of textual script commands. A compilation step before transmission can be omitted, so that, in particular, the programming device does not have to be adapted for compilation for different target systems. This advantage is achieved by the interpreter contained in the control program is not being part of the user program.

In one configuration of the microscope control unit, the control program is stored in the microscope control unit itself. Alternatively, the control program is stored in a subassembly of the microscope control unit.

In a further configuration of the microscope control unit, this has an electronic unit and comprises the assigned control program with an interpreter for the script.

The microscope control unit according to an embodiment of the invention not only permits substantially simpler adaptations of the functional assignment of at least one connection to newly adapted electrically controllable microscope components or other electrically controllable components of the test setup. By omitting the compilation and using the script with the aid of the interpreter, significantly higher speeds can additionally be realized in the control of at least one connection and of the electrically controllable microscope components or components connected to it. For this purpose, in a further configuration of the microscope control unit, the script commands are implemented as real-time commands for driving at least one connection.

A large number of functional assignments of at least one connection of the microscope control unit can be implemented by selecting the script commands. For example, a channel type for at least one connection can be established for the microscope control unit by means of the script commands.

It is also possible for at least one variable and/or at least one command and/or at least one script and/or at least one function block to be provided by means of channels in the microscope control unit by means of the script commands.

Further advantages and embodiments of the invention are given by the description and the accompanying drawings.

It is to be understood that the features mentioned above and the features to be explained in detail below can be used not only in the respective indicated combination, but also in other combinations or alone, without departing from the scope of the present invention.

The invention is schematically presented using an exemplary embodiment and is described below with reference to the drawings.

Figure 2:
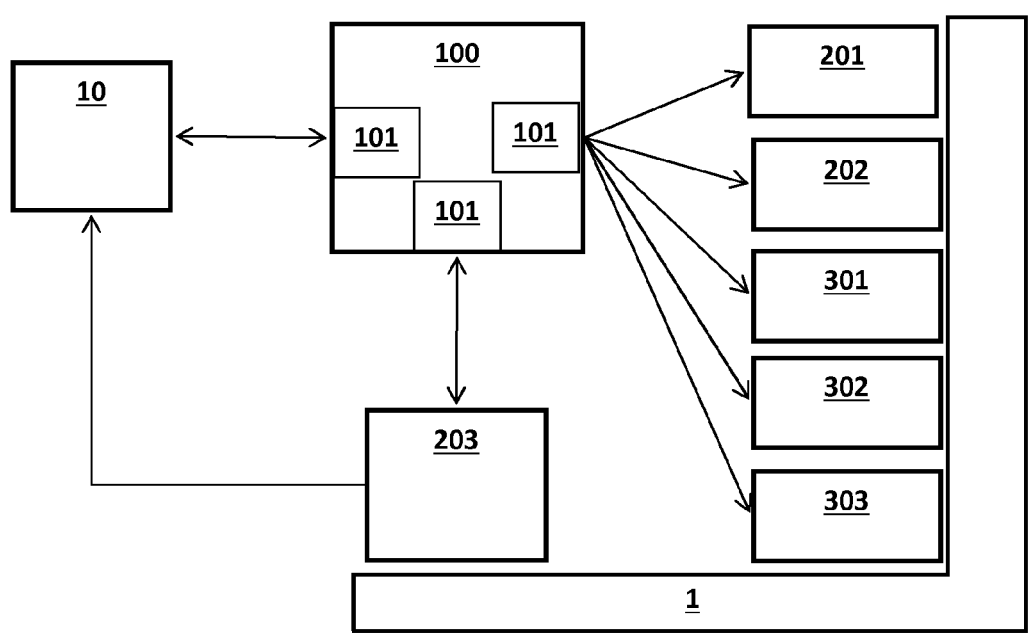
FIG. 2 schematically shows the microscope system from FIG. 1 in another schematic view.

FIGS. 1 and 2 schematically illustrate a microscope system in accordance with a preferred embodiment of the invention. The microscope system comprises a microscope control unit 100, in accordance with a preferred embodiment of the invention, with a script running on the microscope control unit 100 for the use of freely usable connections in the form of inputs and outputs 101 to which a human/machine interface (HMI) embodied here as operating PC 10 and a large number of microscope components 200, 300 are connected for signal-transmission.

The microscope components can, for example, be subdivided into internal microscope components 300 and external microscope components 200. However, this division is insignificant for the invention. The internal microscope components 300 are characterized in that they are mounted on or in the microscope chassis 1 and are regarded as part of the microscope, such as an incident light dial (IL Turret) 301, a Z drive 302, an objective turret 303, etc., whereas, for example, microscope components 200, an XY table 201, an illumination device (optionally with shutter) 202, a camera 203, etc. are regarded as external components. Although these can also be mounted on the microscope chassis 1, they are usually not regarded as part of the microscope. As far as the microscope components 200, 300 each have a controllable actuator (for example an electric motor) they can be controlled within the scope of the invention in a script running on the microscope control unit 100. The script comprises a sequence of selected script commands assigned to functions of inputs and outputs of the microscope control unit 100. Such functions include, in particular, read and write functions.

These microscope components 200, 300 are thus controlled via the microscope control unit 100 which is also referred to as a "microscope master". The microscope master can be implemented by a microcontroller, DSP (digital signal processor) or FPGA (Field Programmable Gate Array).

Components have, in part, dependencies on other components. For example, it may be necessary for the Z drive to be lowered before moving the objective turret in order to prevent a collision of objectives with the XY table. The dependencies, which are absolutely necessary in order to ensure operational reliability, are referred to as critical dependencies and are preferably permanently implemented in the microscope master. i.e. when a movement of the objective turret is controlled, the microscope master automatically also controls the Z drive accordingly. This may include lowering the XY table, rotating the objective turret, and, if necessary, raising the XY table.

With a solution, in accordance with a preferred embodiment of the invention, it is possible to freely configure the controller and dependencies of all components (external and internal). The configuration preferably takes place via HMI, for example PC 10, where the connections to be used to the components to be controlled are declared and the dependencies of the connections among one another are configured. The configuration can be carried out completely or also in parts of the runtime.

To use the single inputs and outputs (connections), each connection is given a unique number, the channel number, in accordance with the preferred embodiment described here. These channel numbers are assigned to the inputs and/or outputs of the microscope control unit 100 by appropriate script commands. In particular, at least one channel can be assigned to each electrically controllable microscope component, wherein each channel in the script is configured by appropriate script commands as input and/or output for sequential or parallel processing.

Via the channel number access takes place from the script, which is configured as part of the control program of the microscope control unit, i.e. of the microscope master 100. The script defines the program flow using channel numbers. The available script commands are permanently implemented in the microscope master 100, here preferably in an interpreter running on the control program of the microscope master 100, and represent rudimentary instructions, for example "writing", "reading", "adding" or "multiplying", which are used, in particular, for processing the defined channels. The available set of instructions is referred to as instruction set. For example, the microscope master may be configured to be able to process one or more of the following commands, some of which are associated with functions of the inputs and outputs of the microscope control unit 100.

NOP: Perform no operation. This instruction generates a minimum delay
SET CHANNEL: Sets the value of a channel.
WAIT CHANNEL: Waits until the specified value is reached.
SET CHANNEL CONDITIONAL: Sets the value of a channel when a condition is met.
COPY CHANNEL VALUE: Copies the value of one channel to the value of another channel
SET SCRIPT INSTRUCTION: Sets the command counter (Instruction pointer) of the main processor of the microscope control unit 100 to the predetermined value.
LOOP SCRIPT: Repeat the current script as often as specified.
WAIT TIME: Waits for a predetermined time.
TIMESTAMP: Generates a time stamp.
ADD CHANNEL: Adds two channel values and assigns the result to a channel.
SUB CHANNEL: Subtracts two channel values and assigns the result to a channel.

The microscope control unit 100, that is to say the microscope Master, executes scripts in a timer with a time grid, wherein the time interval is freely selectable for the temporal grid. This provides real-time capability for the running control program of the microscope control unit 100. Real-time systems are characterized in that a result of a computing operation (e.g. process or task) is calculated in a guaranteed manner within a defined time interval, that is to say is present before a specific time limit. In a real-time system, for example, a so-called real-time operating system, which regulates the different processes and tasks, runs on the processor of the microscope control unit 100 for this purpose. Alternative solutions are also known which do not require a real-time operating system. This is made possible, for example, by the use of state machines and interrupts.

In accordance with the preferred embodiment described here, the number of scripts and the number of script commands defined therein are not limited or limited only by the memory space of the microscope control unit 100, i.e. of the microscope master. Furthermore, scripts can be started and stopped, for example, by user input from the PC 10. Also, in accordance with the preferred embodiment described here, it is possible to start a script from another script. The script itself also has an interface and a channel number to be freely defined, as a result of which a script can be viewed as any other channel with all available operations.

Preferably, the microscope control unit 100 is adapted to provide different channel types, such as one or more of the type "variable", "hardware", "command", "script" and "function block". Each instance of a channel type is assigned a unique channel number. A few examples and definitions are explained below:

Variable: A variable may be written and read.
Hardware: A hardware channel is any analog or digital input/output. This type of channel is used, for example, for triggering external components. For synchronization with an external component, for example a camera, a digital input hardware channel and a digital output hardware channel are, for example, defined. Triggering conditions can be implemented using both channels.
Another example is the generation of a random output voltage in order to control an external component, for example a light source. The value of the output voltage is set from a script.
Command: A command describes an ASCII character string for communication with a component. The ASCII character string to be used is defined before use and may have a static as well as a dynamic part, wherein the dynamic part is always assigned to the type "variable". The dynamic component can be used, for example, to set the position of a component.
For example, the character string "76022 position" is used to set the position of the objective turret. Thereby the position can be either dynamic or static.
Example of a static position:
"76022 1"⇒setting the objective turret to position 1
"76022 2"⇒setting the objective turret to position 2
Example of a Dynamic Position:
"76022 Position"⇒"position" as variable. When the command in the script is used, the value of the variable is read out and taken over as a position specification.
Script: A script consists of any number of sequential instructions for processing channels.
Function block: A function block describes the linking of channels, wherein the function may be a logical, for example, "AND" or "OR" or arithmetic "ADD" or "MULTIPLIER" as well as a permanently defined or freely definable LUT [Look-Up-Table].

To carry out an exemplary experiment by means of a control program running on the microscope control unit 100 the microscope master, the components and parameters to be used are first (during programming) selected and the chronological sequence is configured. The selection and configuration of the script commands in the desired sequence, i.e. the definition of the script, takes place, for example, via the PC 10 in an input menu provided for this purpose. This input menu represents the user interface, which is designed as a user interface of a user program with which desired script commands can be selected from the script command set and their sequence can be defined in the script.

Figure 3:
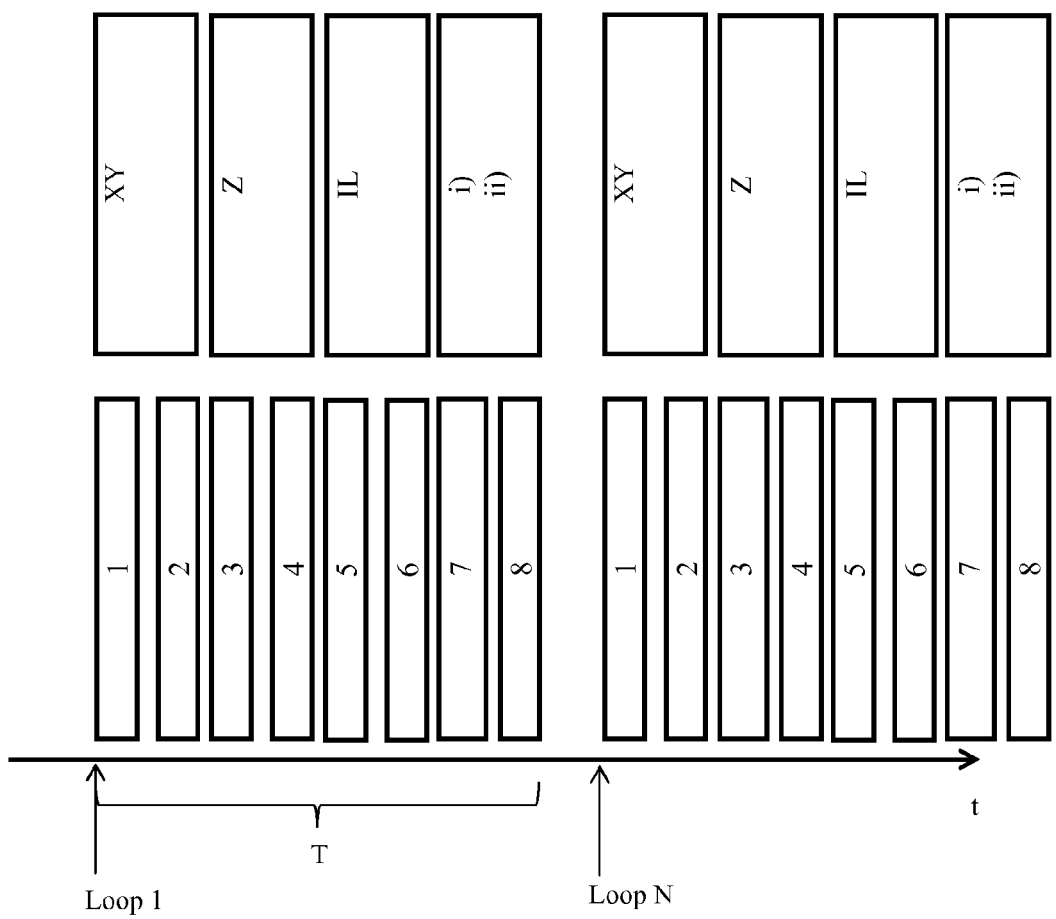
FIG. 3 schematically shows, in a block diagram, a process flow of an exemplary experiment using a microscope system not in accordance with the invention.
Figure 4:
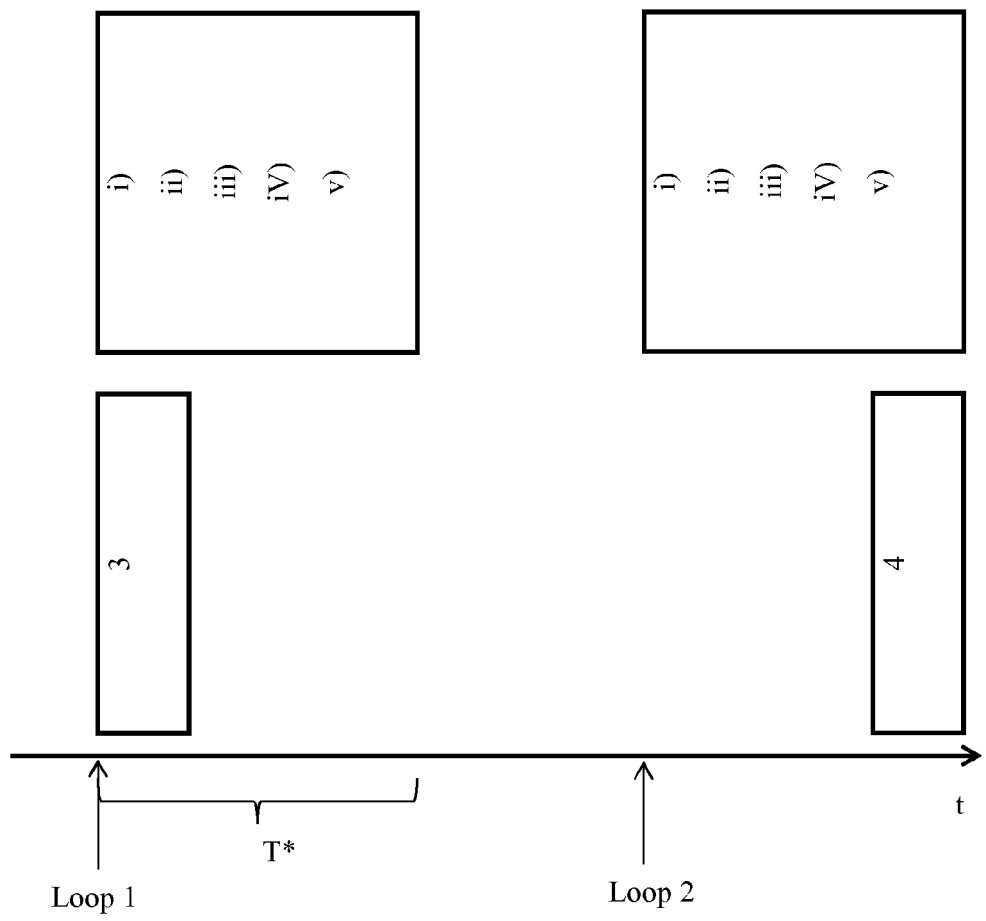
FIG. 4 schematically shows in a block diagram the progression of the experiment using a microscope system in accordance with a preferred embodiment of the invention.

In the following example, the flow of an experiment is shown from XY table 301, illumination 302, and camera 303 components. This procedure is repeated n times within one experiment. The sequence comprises (after configuration/declaration), for example, the following steps:

1. Positioning XY stage
   a) Start positioning
   b) wait until positioning is complete
2. Set illumination intensity set
3. Camera exposure
   a) Open shutter
   b) trigger signal to camera (preferably simultaneously with a) to avoid jitter)
   c) wait for exposure time
   d) Close shutter
   e) trigger signal to camera (preferably simultaneously with d) to avoid jitter)
4. Wait until camera has transmitted the image data to PC
   a) wait for trigger signal from camera to microscope master In a method in accordance with a preferred embodiment of the invention, this means that the control program, as defined in the script, first declares the components XY table 301, camera 303, illumination 302 with shutter to used, in that the interpreter in the control program converts the script into corresponding (machine) commands to the inputs and outputs, i.e. into commands to the interfaces. For example, the interfaces or channel numbers of the components could be as follows:

1. XY-table: Command for Positioning
2. Illumination: Command for setting the intensity
3. Shutter: I/O hardware on microscope master, as digital output
4. Camera exposure: I/O hardware on microscope master, as digital output
5. Camera Image Transmission: I/O hardware on microscope master, as digital input
6. Exposure time: Variable Subsequently, the user creates a script with instructions on the PC via the user interface, for example, in order to process the chronological sequence. The script could be as follows:

1. SET CH1, value 0⇒sets the command to XY table positioning
2. WAIT CH1, value 1⇒waits for the command to be executed
3. SET CH2, value 0⇒sets the command to set the illumination intensity
4. WAIT CH2, value 1⇒waits for the command to be executed
5. SET CH3, value 1⇒open shutter
6. SET CH4, value 1⇒start camera exposure
7. WAIT Time, value from CH6⇒camera exposure, wait until time elapses
8. SET CH3, value 0⇒close shutter
9. SET CH4, value 0⇒stop camera exposure
10. WAIT CHS, value 1⇒wait until camera image transfer completed
11. Loop, 100⇒repeat the previous instructions 100 times In the following, for the experiment described above, a solution not according to the invention (FIG. 3) is now compared to a solution in accordance with the invention (FIG. 4).

Solution not in accordance with the invention

A disadvantage of such a solution is that no access to specific microscope components such as XY table control, Z drive, IL turret is possible in a control program running on the microscope master. These must be controlled by a user program running on the PC, so that overall no real-time experiment is possible. The type and number of electrically controllable components is limited by the firmware prescribed by the manufacturer of the microscope system or the microscope control unit.

Start of loop

1. PC sets command for the XY table to microscope method.
2. PC waits for end of execution
3. PC sets command to move from Z drive to microscope.
4. PC waits for end of execution
5. PC sets command for the method of IL Turret to microscope.
6. PC waits for end of execution
7. PC sets command to start a real-time experiment.
   ⇒Start of real-time experiment in the microscope.
   a) Microscope Master executes
      i) shutter
      ii) camera
   b) Microscope Master end of execution
8. PC waits for end of execution End of loop For steps 1-8, a time T is required.

Solution in accordance with preferred Embodiment of the Invention

Since the microscope control unit 100, the microscope master, is designed to execute a script with script commands and to assign functions of the inputs and outputs which can be selected by means of the interpreter in the control program of the microscope control unit 100, all steps of the experiment can now be carried out within the scope of a control program running on the microscope control unit 100.

Prior to the experiment, the user specifies the script with the script commands for allocating the channels. In this case, the terminals to be used are also configured, for example, with regard to the protocol to be used, etc. the script prepared by the user contains the selected script commands in the selected sequence. The interpreter of the control program converts the script into instructions for configuring the connections, for setting the channels of the inputs and outputs of the microscope control unit 100 and thus into commands for controlling all electrically controllable components. The real-time experiment is thus started.

1. PC transmits the script prepared by the user to the microscope control unit 100 the microscope master
2. Microscope Master starts interpreter and script execution
3. Microscope Master starts interpreter for script execution Start of loop
   a) script commands directly control components
      i) XY table method
      ii) Z driving Method
      iii) incident light turntable (IL Turret) method
      iv) Set illumination
      v) Camera exposure time and shutter control
   b) Script reports to microscope master: End of execution End of loop 4. Feedback to PC is dispensed with For steps 1-3, a time T* is required, which is significantly shorter than the time T for the experiment not in accordance with the invention, on account of the reduced responsibility changes described above.

It is thus not necessary for the PC to first compute the assignment of the channels successively for each individual experiment step during the experiment and to generate the individual, current commands in succession. Each subsequent control command is transmitted from the PC to the microscope control unit 100 only after feedback about the completion of the preceding experimental step. Technically, this leads to a constant change of responsibility between the PC and the microscope control unit 100, whereby time is consumed. In experiments with many individual experimental steps, such as many changes in the table position in the xy plane, many changes in the focus position by adjusting the z drive and/or many exposure cycles with turning on and off of the light source and corresponding triggering of the exposure times of the camera, this all adds up to a considerable loss of time.

In the microscope control unit 100 in accordance with the invention, due to the script being freely configurable by the user before the experiment, the commands in the form of the script commands are now available in real time to the microscope control unit 100 and consequently to the microscope system. This leads to a significantly faster procedure for the experiment. In addition, by providing a script outside the firmware, the user can integrate any electrically addressable components into his or her experiment.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A microscope control unit, comprising:
   at least one connection which is connectable to one or more electrically addressable microscope components or other electrically controllable components,
   wherein at least one connection parameter of the at least one connection is programmatically configurable,
   wherein at least one script with script commands is provided on the microscope control unit, the at least one script having an interface,
   wherein the at least one connection is addressable by the script commands,
   wherein the at least one connection is provided with a first channel number of a plurality of channel numbers, and
   wherein the at least one script is provided with a second channel number of the plurality of channel numbers.

2. The microscope control unit according to claim 1, wherein the at least one connection parameter is programmatically configurable by the script commands.

3. The microscope control unit according to claim 1, wherein the at least one connection parameter comprises at least one parameter which configures the at least one connection as an input or output and/or as an analog or digital connection and/or as a current or voltage interface.

4. The microscope control unit according to claim 1, wherein the at least one connection parameter comprises a communication protocol and/or a transmission rate and/or a signal amplitude.

5. The microscope control unit according to claim 1, wherein the at least one connection is configurable as an analog input or as a digital input, and/or
   wherein the at least one connection comprises an analog input, and/or
   wherein the at least one connection comprises a digital input.

6. The microscope control unit according to claim 1, wherein the at least one connection is selectively configurable as an analog output or as a digital output, and/or
   wherein the at least one connection comprises an analog output, and/or
   wherein the at least one connection comprises a digital output.

7. The microscope control unit according to claim 1, being set up to actuate an arbitrary combination of the one or more electrically controllable microscope components or other electrically addressable components by the script commands via the at least one connection.

8. The microscope control unit according to claim 1, to which there is a script command set, wherein the script commands of the at least one script are selectable from the script command set by a user, and
   wherein a sequence of the script commands in the at least one script is specifiable.

9. The microscope control unit according to claim 8, being configured to be connected in a data-transmitting manner to a user interface, via which the script commands of the at least one script are selectable by the user from the script command set and the sequence of the script commands in the at least one script is specifiable.

10. The microscope control unit according to claim 9, wherein the user interface is formed as a hardware-based input unit of a programming device or as a user interface of a user program running on a separate computing unit.

11. The microscope control unit according to claim 1, wherein the at least one script is transferable as a text file to the microscope control unit.

12. The microscope control unit according to claim 1, having assigned thereto a control program with an interpreter for the at least one script that converts the script commands into functions of the at least one connection.

13. The microscope control unit according to claim 12, wherein the control program is stored in the microscope control unit or in a subassembly in the microscope control unit.

14. The microscope control unit according to claim 12, further comprising an electronic unit having associated thereto the control program with the interpreter for the at least one script.

15. The microscope control unit according to claim 1, wherein the script commands are implementable as real-time commands.

16. The microscope control unit according to claim 1, wherein channel types for the at least one connection are specifiable by the script commands.

17. The microscope control unit according to claim 1, wherein the script commands are usable to provide at least one variable and/or at least one command and/or the at least one script and/or at least one function block via channels.

18. A microscope system comprising the microscope control unit according to claim 1, and being connected to the one or more electrically controllable microscope components or other electrically controllable components in a data-transmitting manner.

19. A method for operating a microscope control unit with at least one connection which is connectable to one or more electrically controllable microscope components or other electrically controllable components, the method comprising:
  storing at least one script with script commands on the microscope control unit, the at least one script having an interface;
  programmatically configuring at least one connection parameter of the at least one connection,
  wherein the at least one connection is provided with a first channel number of a plurality of channel numbers, and
  wherein the at least one script is provided with a second channel number of the plurality of channel numbers.

20. The method according to claim 19, further comprising operating the microscope control unit,
  wherein at least one connection parameter of the at least one connection is programmatically configurable by the script commands,
  wherein the at least one script with the script commands is provided on the microscope control unit, and
  wherein the at least one connection is addressable by the script commands.

* * * * *